(12) United States Patent
Brophy et al.

(10) Patent No.: US 10,798,177 B2
(45) Date of Patent: *Oct. 6, 2020

(54) HVAC CONTROLLER WITH INTEGRATED WIRELESS NETWORK PROCESSOR CHIP

(71) Applicant: Johnson Controls Technology Company, Auburn Hills, WI (US)

(72) Inventors: Christopher Brophy, Cedarburg, WI (US); Kim K. Weller, Mukwonago, WI (US); Daniel R. Gottschalk, Racine, WI (US); Ryan J. Bykowski, South Milwaukee, WI (US); Tom Z. Zhuang, Vernon Hills, IL (US)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/687,539

(22) Filed: Nov. 18, 2019

(65) Prior Publication Data

US 2020/0092378 A1 Mar. 19, 2020

Related U.S. Application Data

(63) Continuation of application No. 16/590,502, filed on Oct. 2, 2019, and a continuation of application No.
(Continued)

(51) Int. Cl.
*H04L 29/08* (2006.01)
*H04L 29/06* (2006.01)
(Continued)

(52) U.S. Cl.
CPC ............ *H04L 67/125* (2013.01); *F24F 11/30* (2018.01); *F24F 11/62* (2018.01);
(Continued)

(58) Field of Classification Search
None
See application file for complete search history.

(56) References Cited

U.S. PATENT DOCUMENTS 5,565,855 A 10/1996 Knibbe
9,618,222 B1 * 4/2017 Hussain .................. F24F 11/30
(Continued)

*Primary Examiner* — Edan Orgad
*Assistant Examiner* — Emmanuel K Maglo
(74) *Attorney, Agent, or Firm* — Foley & Lardner LLP

(57) ABSTRACT

A controller in a building management system (BMS) includes an integrated wireless network processor chip. The integrated wireless network processor chip includes a wireless radio, a processor, and memory. The wireless radio is configured to exchange data communications with one or more BMS devices controlled by the controller. Both the processor and memory are in communication with the wireless radio and located on the same chip as the wireless radio. The memory includes communication stacks configured to facilitate communications using a building automation and control network communications protocol and a Wi-Fi communications protocol. The integrated wireless network processor chip receives data from the BMS devices via the wireless radio, formats the data using the processor, stores the data in the memory, and sends the data via the wireless radio without requiring any additional processing or communications components outside the integrated wireless network processor chip.

25 Claims, 12 Drawing Sheets

Related U.S. Application Data

15/146,678, filed on May 4, 2016, now Pat. No. 10,484,478, said application No. 16/590,502 is a continuation of application No. 15/146,678, filed on May 4, 2016, now Pat. No. 10,484,478.

(60) Provisional application No. 62/156,851, filed on May 4, 2015.

(51) Int. Cl.
 | | |
 |---|---|
 | H04L 12/28 | (2006.01) |
 | F24F 11/30 | (2018.01) |
 | F24F 11/62 | (2018.01) |
 | H04W 12/08 | (2009.01) |
 | H04W 40/24 | (2009.01) |
 | H04W 84/12 | (2009.01) |

(52) U.S. Cl.
 CPC .......... H04L 12/2816 (2013.01); H04L 69/18 (2013.01); H04W 12/0806 (2019.01); *H04L 63/0428* (2013.01); *H04L 67/02* (2013.01); *H04L 2012/2841* (2013.01); *H04W 40/248* (2013.01); *H04W 84/12* (2013.01)

(56) References Cited

U.S. PATENT DOCUMENTS

| | | |
|---|---|---|
| 2005/0065742 A1 | 3/2005 | Rodgers |
| 2005/0125083 A1 | 6/2005 | Kiko |
| 2006/0007935 A1 | 1/2006 | Bennett et al. |
| 2006/0159043 A1 | 7/2006 | Delp et al. |
| 2008/0033599 A1 | 2/2008 | Aminpour et al. |
| 2009/0150004 A1 | 6/2009 | Wang et al. |
| 2010/0138764 A1* | 6/2010 | Hatambeiki ..... H04N 21/42208 715/765 |
| 2010/0177750 A1 | 7/2010 | Essinger et al. |
| 2010/0187832 A1 | 7/2010 | Holland et al. |
| 2012/0071082 A1* | 3/2012 | Karamanos ........... F24F 5/0003 454/284 |
| 2012/0098446 A1 | 4/2012 | Kim et al. |
| 2013/0018513 A1* | 1/2013 | Metselaar ................ F24F 11/30 700/278 |
| 2013/0085615 A1 | 4/2013 | Barker |
| 2014/0067150 A1 | 3/2014 | Songkakul et al. |
| 2014/0142905 A1 | 5/2014 | Drees et al. |
| 2014/0229015 A1 | 8/2014 | Wehrli |
| 2014/0277765 A1 | 9/2014 | Karimi et al. |
| 2014/0282978 A1 | 9/2014 | Lerner et al. |
| 2014/0371935 A1 | 12/2014 | Kamel et al. |
| 2014/0371936 A1 | 12/2014 | Kamel et al. |
| 2015/0094860 A1 | 4/2015 | Finnerty et al. |
| 2015/0181413 A1 | 6/2015 | Singamsetti et al. |
| 2016/0059120 A1 | 3/2016 | Komorous-King et al. |
| 2016/0094388 A1 | 3/2016 | Britt et al. |
| 2016/0189528 A1 | 6/2016 | Lee et al. |
| 2017/0008419 A1 | 1/2017 | Kim |
| 2017/0176034 A1 | 6/2017 | Hussain et al. |

\* cited by examiner

HVAC CONTROLLER WITH INTEGRATED WIRELESS NETWORK PROCESSOR CHIP

CROSS-REFERENCE TO RELATED APPLICATIONS

This application is a continuation of U.S. patent application Ser. No. 15/146,678, filed May 4, 2016, (now U.S. Pat. No. 10,484,478) which claims the benefit of and priority to U.S. Provisional Patent Application No. 62/156,851, filed May 4, 2015 and is a continuation of U.S. patent application Ser. No. 16/590,502, filed Oct. 2, 2019 which is a continuation of U.S. patent application Ser. No. 15/146,678, filed May 4, 2016, (now U.S. Pat. No. 10,484,478) which claims the benefit of and priority to U.S. Provisional Patent Application No. 62/156,851, filed May 4, 2015, the entire contents each of which are incorporated by reference herein.

BACKGROUND

The present disclosure relates generally to building automation and control networks. The present disclosure relates more particularly to a controller in a building automation and control network with an integrated wireless network processor chip.

In conventional building automation and control networks, a sensor actuator (SA) bus is typically used to exchange communications between BMS devices. The SA bus may include a communication trunk (e.g. RS-485 circuitry) along with hardware associated with the communication trunk (e.g., level shifting hardware, end-of-line and address switches, insolated power supplies, wiring connectors, etc.). These components can increase cost and add to the complexity of configuring the automation and control network. Other building automation and control networks add wireless connectivity to an existing network architecture. However, such wireless connectivity is typically provided by an additional wireless communications device or chip that is merely added to existing networking components.

SUMMARY

One implementation of the present disclosure is a controller in a building management system (BMS). The controller includes an integrated wireless network processor chip. The integrated wireless network processor chip includes a wireless radio configured to exchange data communications with one or more BMS devices controlled by the controller. The integrated wireless network processor chip includes a processor in communication with the wireless radio and located on a same chip as the wireless radio. The integrated wireless network processor chip includes memory in communication with the wireless radio and located on the same chip as the wireless radio. The memory includes communication stacks configured to facilitate communications using a building automation and control network communications protocol and a Wi-Fi communications protocol. The integrated wireless network processor chip receives data from the BMS devices via the wireless radio, formats the data using the processor, stores the data in the memory, and sends the data via the wireless radio without requiring any additional processing or communications components outside the integrated wireless network processor chip.

Another implementation includes a building management system. The building management system includes one or more HVAC devices, a user device, and an HVAC controller. The HVAC controller includes an integrated wireless network processor chip. The integrated wireless network processor chip includes a wireless radio configured to exchange data communications with one or more HVAC devices controlled by the HVAC controller. The HVAC controller further includes a processor in communication with the wireless radio and located on a same chip as the wireless radio, and a memory in communication with the wireless radio and located on the same chip as the wireless radio. The integrated wireless network process chip provides communication with the one or more HVAC devices using a first communication protocol associated with a first communication stack contained in the memory, and provides communication with the user device using a second communication protocol associated with a second communication stack contained in the memory.

Another implementation includes a method of communicating with a plurality of networks using an integrated wireless network processor chip. The method includes initializing the integrated wireless network processor chip. The method further includes establishing a first wireless network and a second wireless network using the integrated wireless network processor chip. The method also includes verifying a network connection of the integrated wireless network processor chip to the first wireless network and the second wireless network. The method further includes processing a first data request from the first wireless network and a second data request from the second wireless network, and updating one or more parameters based on the processed first data request and the processed second data request.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Referring generally to the FIGURES, a controller with an integrated wireless network processor chip is shown, according to an exemplary embodiment. The integrated wireless network processor chip may be configured to facilitate wireless data communications between the controller and various devices monitored and/or controlled by the controller. In some embodiments, the data communications are BMS communications such as sensor measurements (e.g., measured temperatures, pressures, voltages, etc.), feedback signals, control signals, or any other type of communication between devices in a building automation and control network. The controller may also communicate with a router, a BMS controller, a user device, and/or other types of systems or devices using the integrated wireless network processor chip. Advantageously, the controller uses the integrated wireless network processor chip to communicate with BMS devices without requiring hardware or support for conventional serial bus communications (i.e., without requiring a SA bus). In other embodiments, the controller includes an SA bus (e.g., to communicate with BMS devices) in addition to the wireless network processor chip.

In some embodiments, the integrated wireless network processor chip is a single-chip microcontroller unit with built-in wireless connectivity. The integrated wireless network processor chip may include both wireless communications components (e.g., a WiFi radio, communications stacks, a WiFi driver, communications protocols, etc.) and data processing components (e.g., a processor, memory, control logic, etc.). This allows the integrated wireless network processor chip to perform both communications and control functions within the infrastructure of a single chip without requiring any other communications or processing components.

In some embodiments, the integrated wireless network processor chip is configured to communicate using a building automation system protocol. For example, the integrated wireless network processor chip may include a Building Automation and Control Networks (BACnet) stack that allows the integrated wireless network processor chip to communicate with BMS devices using the BACnet communications protocol. In some embodiments, the integrated wireless network processor chip includes a JavaScript Object Notation (JSON) stack that allows the integrated wireless network processor chip to communicate with BMS devices using the JSON communications protocol. In various embodiments, the integrated wireless network processor chip may include any number or type of communications stacks (e.g., SSL, UDP, TCP, IP, 802.11, etc.) to allow the integrated wireless network processor chip to communicate using any of a variety of wireless communications protocols.

These and other features of the present invention are described in greater detail below.

Building Management System and HVAC System

Figure 1:
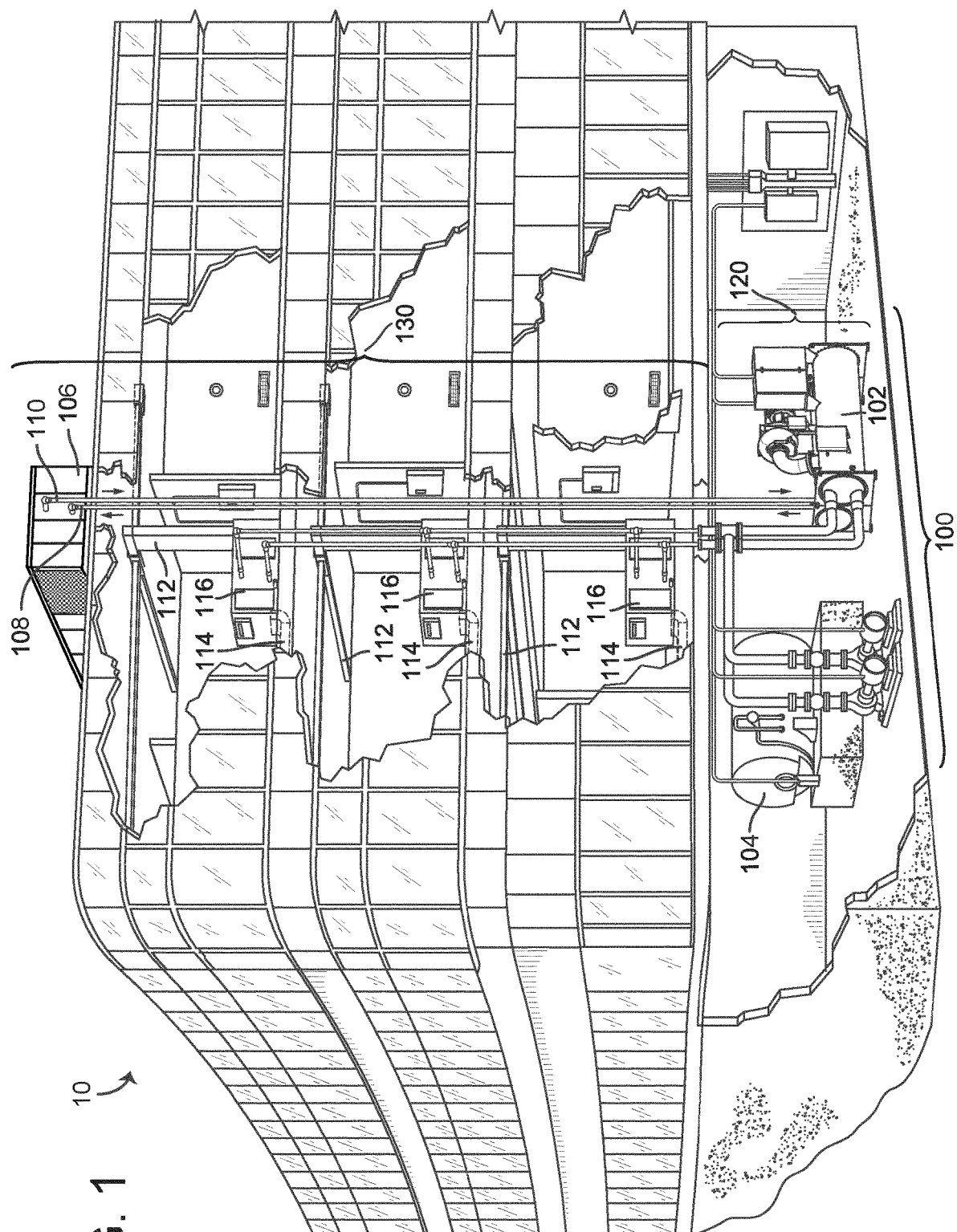
FIG. 1 is a perspective view of a building equipped with a HVAC system, according to one embodiment.

Referring now to FIGS. 1-4, an exemplary building management system (BMS) and HVAC system in which the systems and methods of the present invention may be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which may be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
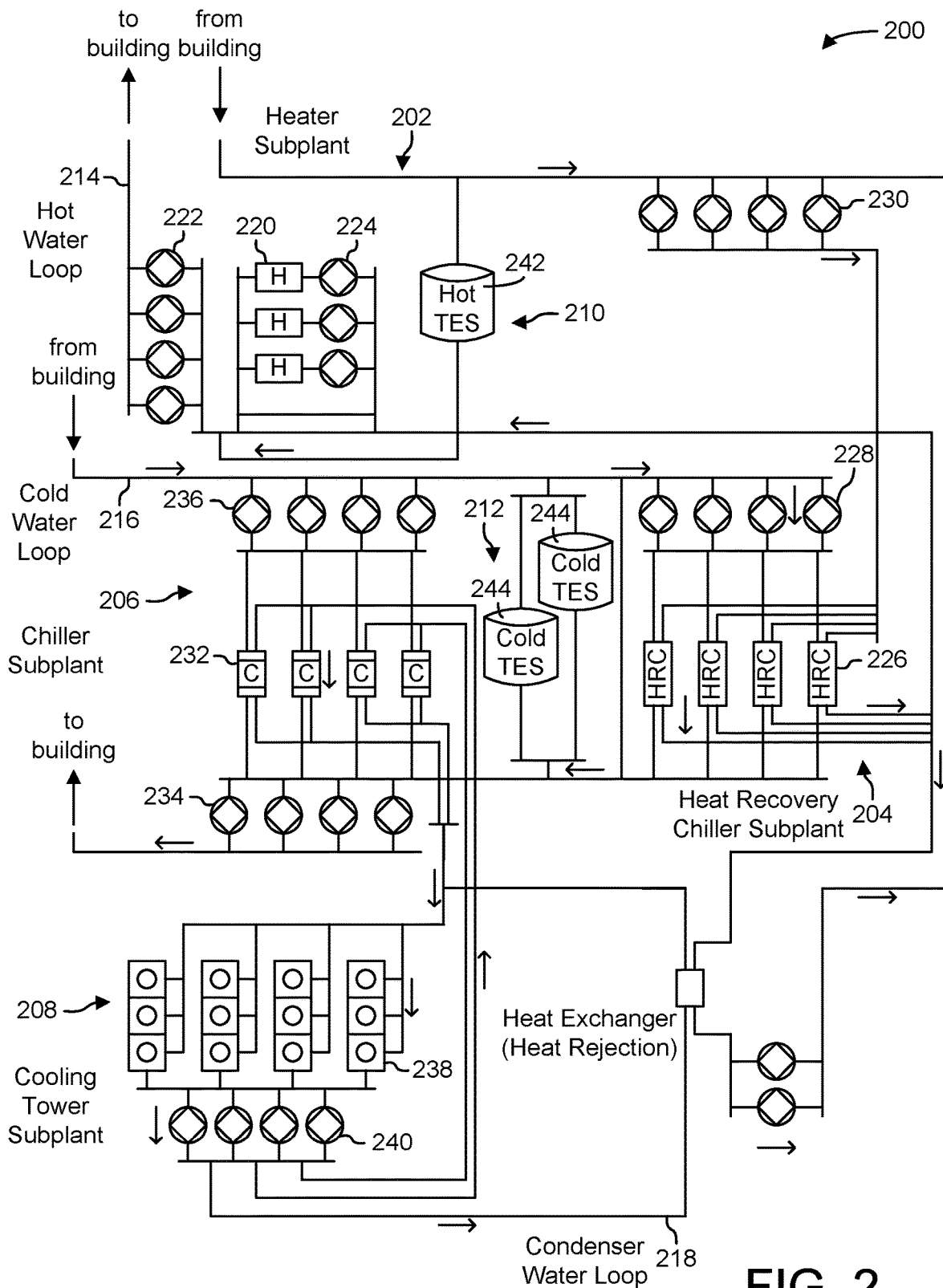
FIG. 2 is a schematic diagram of a waterside system which may be used in conjunction with the building of FIG. 1, according to one embodiment.

Referring now to FIG. 2, a block diagram of a waterside system 200 is shown, according to an exemplary embodiment. In various embodiments, waterside system 200 may supplement or replace waterside system 120 in HVAC system 100 or may be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 may be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) may be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
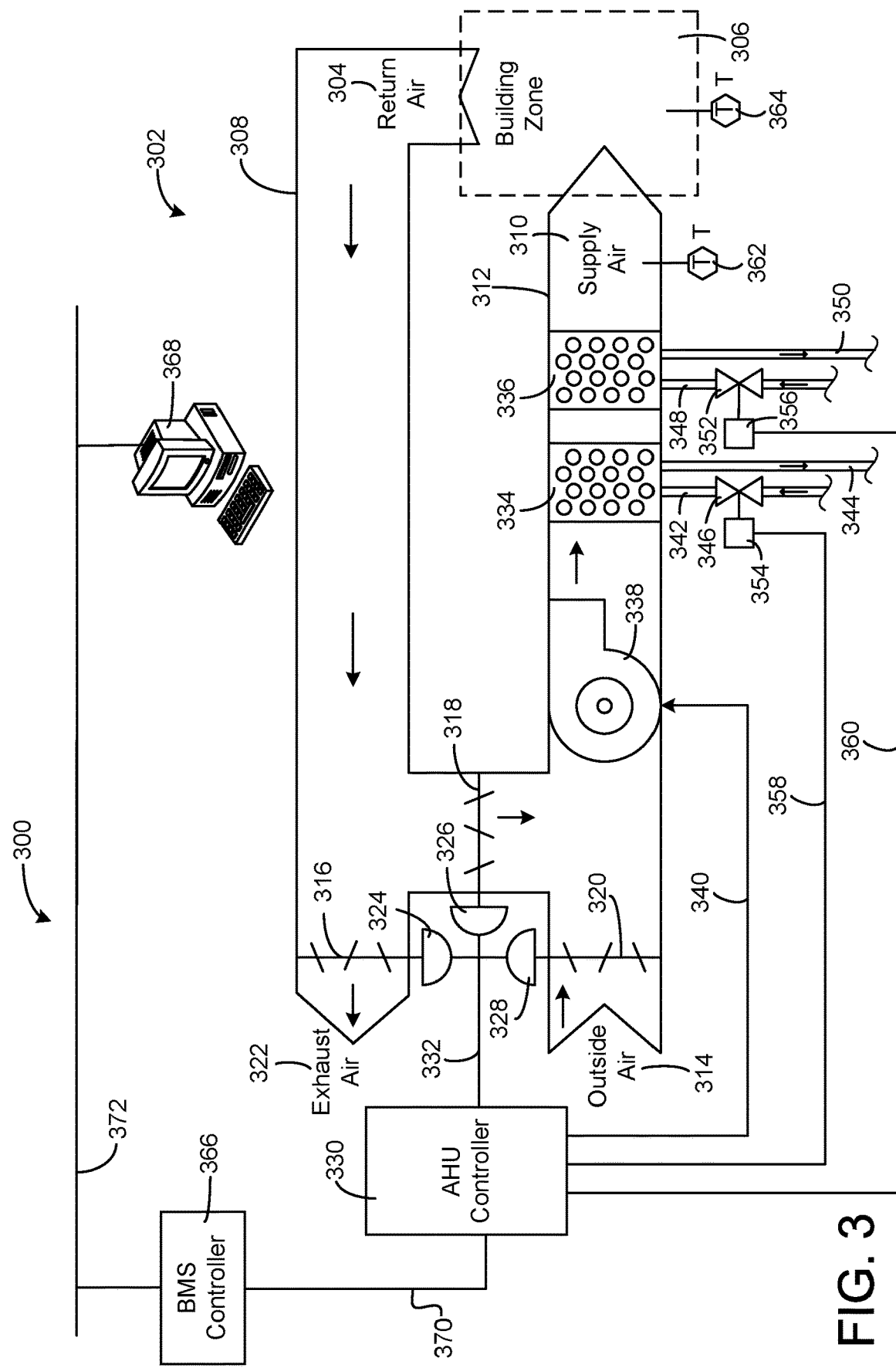
FIG. 3 is a schematic diagram of a waterside system which may be used in conjunction with the building of FIG. 1, according to one embodiment.

Referring now to FIG. 3, a block diagram of an airside system 300 is shown, according to an exemplary embodiment. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 may be separate (as shown in FIG. 3) or integrated. In an integrated implementation, AHU controller 330 may be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
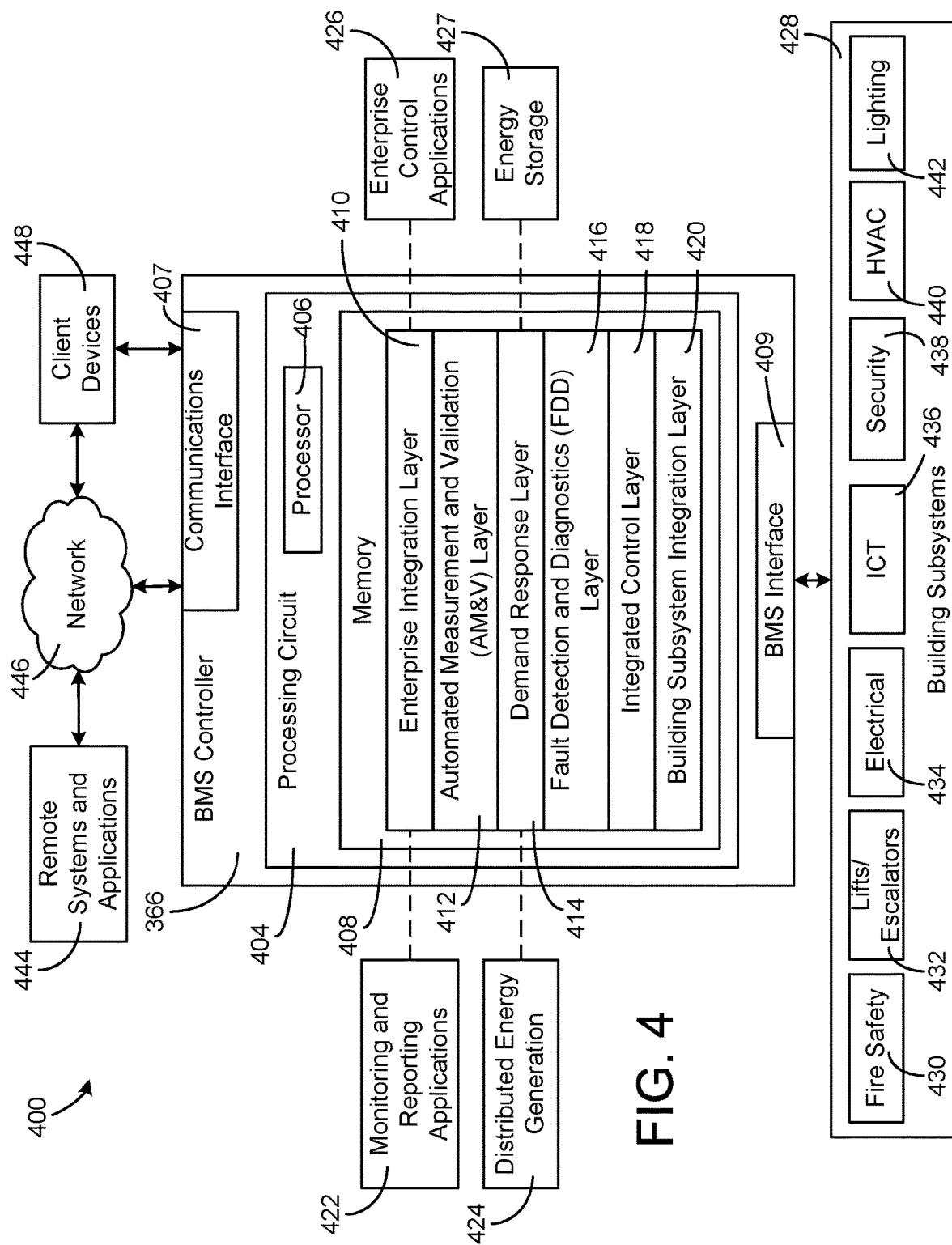
FIG. 4 is a block diagram of a building management system (BMS) which may be used in conjunction with the building of FIG. 1, according to one embodiment.

Referring now to FIG. 4, a block diagram of a building management system (BMS) 400 is shown, according to an exemplary embodiment. BMS 400 may be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 may be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 may be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 may be or include volatile memory or non-volatile memory. Memory 408 may include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 may be distributed across multiple servers or computers (e.g., that can exist in distributed locations). Further, while FIG. 4 shows applications 422 and 426 as existing outside of BMS controller 366, in some embodiments, applications 422 and 426 may be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 may be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 may be configured to serve clients or local applications with information and services to support a variety of enterprise-level applications. For example, enterprise control applications 426 may be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 may be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 may be configured to optimize resource usage (e.g., electricity use, natural gas use, water use, etc.) and/or the monetary cost of such resource usage in response to satisfy the demand of building 10. The optimization may be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases XML files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the demand response policy definitions can specify which equipment may be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 may be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 may be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 may be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 may be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 may be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 may be configured to provide calculated inputs (e.g., aggregations) to these higher levels based on outputs from more than one building subsystem.

Automated measurement and validation (AM&V) layer 412 may be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 may be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 may be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 may be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) may shut-down systems or direct control activities around faulty devices or systems to reduce energy waste, extend equipment life, or assure proper control response.

FDD layer 416 may be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Controller with Integrated Wireless Network Processor Chip

Figure 5:
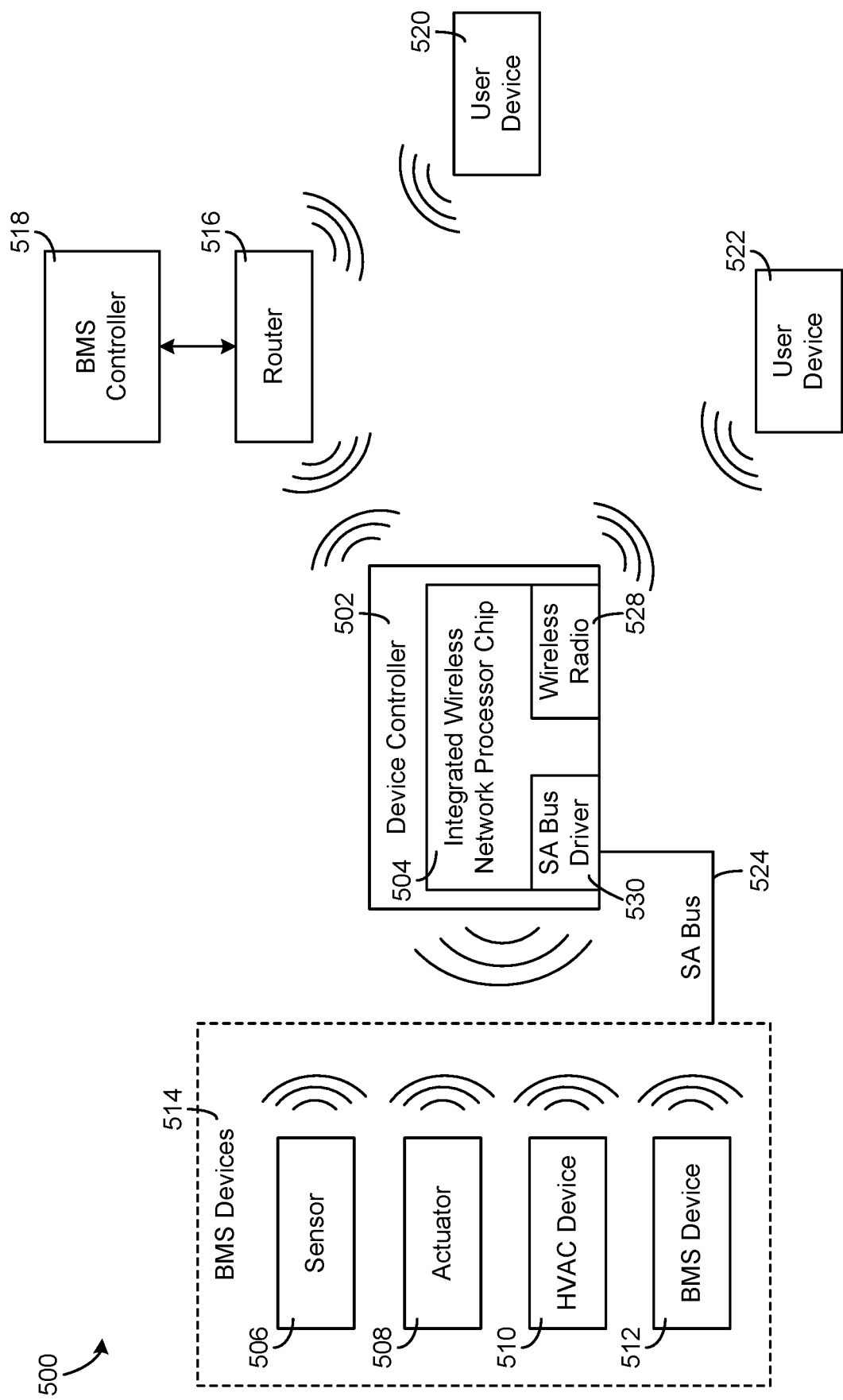
FIG. 5 is a block diagram of a building automation and control network which may be used in the BMS of FIG. 4, according to one embodiment.

Referring now to FIG. 5, a block diagram of a building automation and control network 500 is shown, according to one embodiment. Network 500 may be implemented as a component of a BMS (e.g., BMS 400) to facilitate communications between various devices of the BMS (e.g., controllers, building equipment, building subsystems, etc.).

Network 500 is shown to include a device controller 502. In some embodiments, the device controller 502 is a controller for HVAC equipment (e.g., a chiller controller, an AHU controller, a subplant controller, etc.). Although the present invention is described primarily with respect to HVAC devices, it should be understood that the systems and methods described herein can be used in conjunction with any type of equipment or device. For example, the device controller 502 may be a controller for any type of controllable system or device (e.g., HVAC equipment, lighting equipment, security equipment, electrical equipment, etc.).

The device controller 502 is shown to include an integrated wireless network processor chip 504. The integrated wireless network processor chip 504 may be configured to facilitate wireless data communications between the device controller 502 and various devices monitored and/or controlled by the device controller. For example, the device controller 502 is shown communicating wirelessly with a sensor 506, an actuator 508, an HVAC device 510, and a BMS device 512. Throughout this disclosure, the devices with which the device controller 502 communicates are referred to collectively as "BMS devices" 514. The device controller 502 may exchange data communications with these and other types of BMS devices 514 via the integrated wireless network processor chip 504. In some embodiments, the data communications are BMS communications such as sensor measurements (e.g., measured temperatures, pressures, voltages, etc.), feedback signals, control signals, or any other type of communication between devices in a building automation and control network. The device controller 502 may also communicate with a router 516, a BMS controller 518, one or more user devices 520, 522, and/or other types of systems or devices using the integrated wireless network processor chip 504.

In conventional building automation and control networks, a sensor actuator (SA) bus is used to exchange communications between BMS devices 514. The SA bus may include a communication trunk (e.g. RS-485 circuitry) along with hardware associated with the communication trunk (e.g., level shifting hardware, end-of-line and address switches, insolated power supplies, wiring connectors, etc.). These components can increase cost and add to the complexity of configuring the automation and control network. Other building automation and control networks add wireless connectivity to an existing network architecture. However, such wireless connectivity is typically provided by an additional wireless communications device or chip that is merely added to existing networking components. Advantageously, the device controller 502 shown in FIG. 5 uses the integrated wireless network processor chip 504 to communicate with BMS devices 514 without requiring hardware or support for conventional serial bus communications (i.e., without requiring a SA bus).

It is contemplated that the device controller 502 shown in FIG. 5 can include an SA bus 524 in addition to the integrated wireless network processor chip 504 in various other embodiments. The SA bus 524 may be used by the device controller 502 to communicate with the BMS devices 514 (e.g., using a BACnet or JSON communications protocol). The integrated wireless network processor chip 504 may receive data via the SA bus 524 and transmit the data to other systems or devices wirelessly, such as the BMS controller 518 or the user devices 522, 524. In some embodiments, the SA bus 524 is combined with the integrated wireless network processor chip 504. For example, the integrated wireless network processor chip 504 may include both a wireless radio 528 and an SA bus driver 530 for conducting both wired and wireless data communications.

In some embodiments, the integrated wireless network processor chip 504 is a single-chip microcontroller unit with built-in wireless connectivity. For example, the integrated wireless network processor chip 504 may be a SIM-PLELINK brand microcontroller unit, as sold by Texas Instruments (e.g., model number CC2630, CC3200, or the like). The integrated wireless network processor chip 504 may include both wireless communications components (e.g., a WiFi radio, communications stacks, a WiFi driver, communications protocols, etc.) and data processing components (e.g., a processor, memory, control logic, etc.). This allows the integrated wireless network processor chip 504 to perform both communications and control functions within the infrastructure of a single chip without requiring any other communications or processing components.

In some embodiments, the integrated wireless network processor chip 504 is configured to communicate using a building automation system protocol. For example, the integrated wireless network processor chip 504 may include a Building Automation and Control Networks (BACnet) stack that allows the integrated wireless network processor chip 504 to communicate with BMS devices 514 using the BACnet communications protocol. In some embodiments, the integrated wireless network processor chip 504 includes a JavaScript Object Notation (JSON) stack that allows the integrated wireless network processor chip 504 to communicate with BMS devices 514 using the JSON communications protocol. In various embodiments, the integrated wireless network processor chip 504 may include any number or type of communications stacks (e.g., SSL, UDP, TCP, IP, 802.11, etc.) to allow the integrated wireless network processor chip 504 to communicate using any of a variety of wireless communications protocols.

Still referring to FIG. 5, the device controller 502 may be configured to receive data from the BMS devices 514 (e.g., sensors, actuators, HVAC devices, etc.) via the wireless radio 528 of the integrated wireless network processor chip 504. The integrated wireless network processor chip 504 may use an integrated processor (i.e., within the integrated wireless network processor chip 504) to format the data and store the data within a memory of the integrated wireless network processor chip 504. The integrated wireless network processor chip 504 may be configured to wrap the data in a Wi-Fi protocol and send the data to one or more of the user devices 522, 524, the router 516, or another system or device via the wireless radio 528. Advantageously, the data from the BMS devices 514 can be received, processed, stored, formatted, and communicated to another system or device using only the integrated wireless network processor chip 504 (i.e., without requiring an external processor, memory, or any other component outside the integrated wireless network processor chip). In one embodiment, some or all of the BMS devices 514 include an integrated wireless radio for communication to the device controller 502 using the integrated wireless network processor chip 504. The integrated wireless radios can be Wi-Fi, Zigbee, Bluetooth, LoRa, etc. In one example, the BMS devices 514 may include wireless radios for communication directly with the integrated wireless network processor chip 504. The BMS devices 514 may include an integrated wireless network processor chip, similar to integrated wireless network processor chip 504, discussed above.

In one embodiment, one or more of the user devices 522, 524 are mobile devices. Mobile devices can include smartphones, tablets, laptops, smart watches, or other wireless devices having wireless communication capabilities. In one embodiment, the user devices 522, 524 communicate directly with the device controller 502, via the integrated wireless network processor chip 504. This can allow a user of the user device 522, 524 to access the BMS devices 514 directly from their user device 522, 524. In one example, a user may be able to access sensor data from the sensor device 506 on their user device 522, 524 via wireless communication with the user device controller 502. Additionally, the user device 522, 524 may be able to provide access to setpoints, status information, device ID's, or other applicable data associated with one or more of the BMS devices 514. Furthermore, in some embodiments, the user device 522, 524 allows for modification of parameters and/or setpoints of the BMS devices 514. Additionally, if the device controller 502 is coupled to an SA bus, the user device 522, 524 can access all BMS devices 514 coupled to the SA bus 524. This can allow the user device 522, 524 direct access to a JSON or BACnet backbone via the integrated wireless network processor chip 504 on the device controller 502. In one embodiment, the user device 522, 524 is configured to access and control one or more of the BMS devices 514 using an application installed on the user device 522, 524 which provides a user interface for reading and writing to the BMS devices 514 and/or device controller 502.

Referring now to FIGS. 6-9, several exemplary user interfaces that can be presented via a display of a user device, such as user devices 522, 524 described above, are shown, according to one embodiment. In some embodiments, these interfaces are generated by an application running on the user device. In other embodiments, the interfaces are generated by the device controller 502 and/or the BMS controller 518.

Figure 6:
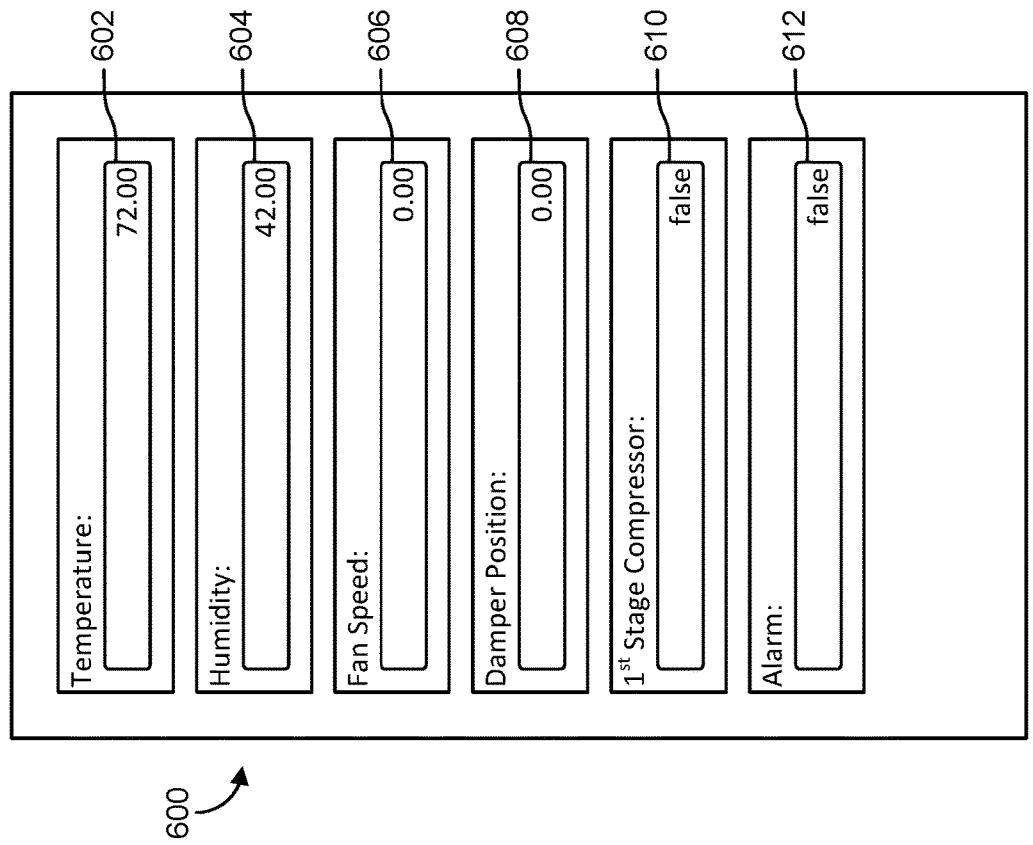

Referring particularly to FIG. 6, a user interface 600 for modifying a parameter of a BMS device is shown, according to one embodiment. The BMS device may be an HVAC device such as a VAV or an AHU device, as described above. However, it is contemplated that the BMS device can be any device associated with a given building management system. The user interface 600 can display multiple parameters at one time. For example, user interface 600 can display a temperature parameter 602, a humidity parameter 604, a fan speed parameter 606, a damper position parameter 608, a compressor parameter 610, and an alarm parameter 612. However, it is contemplated that the user interface 600 may be used to modify and/or view any parameter associated with a particular BMS device. Some parameters may be read only, such as the temperature parameter 602 and/or the humidity parameter 604, which may display current sensed parameters (i.e. temperature and/or humidity). Other parameters may be read/write parameters, thereby allowing a user to modify the read/write parameters via the user interface 600. As shown in FIG. 6, read/write parameters can include the fan speed parameter 606, the damper position parameter 608, the compressor parameter 610, and the alarm parameter 612.

Figure 7:
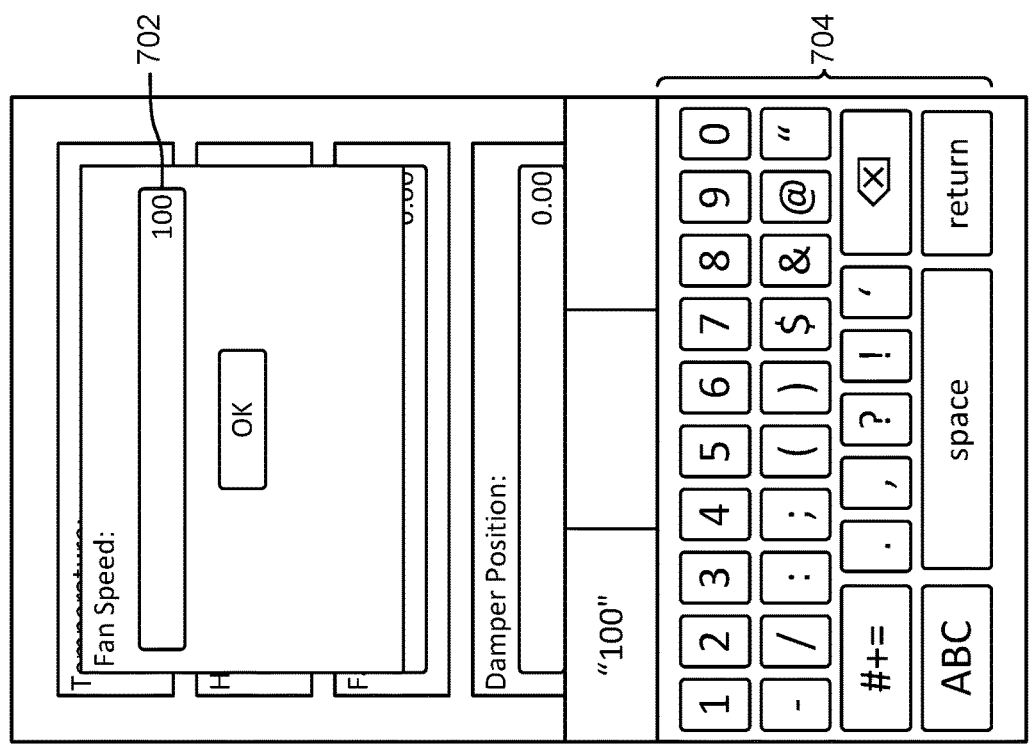
FIGS. 6-9 are representations of user interfaces for modifying a parameter of a BMS device, according to one embodiment.

Referring to FIG. 7, a parameter input dialog box 702 is shown on user interface 600. Parameter input dialog box 702 can allow a user to input a desired parameter value using input device 704. While input device 704 is shown as a number of variable or "soft keys" displayed and accessible on the user interface 600, it is contemplated that the input device 704 can be an external device such as a keyboard or a keypad. In one embodiment, the type of input value can be defined based on the type of parameter. For example, parameter input dialog box 702 shows a numerical value being input for the fan speed parameter 606. The input type can be defined such that a numerical value, such as "100" can be defined to mean a percentage of a maximum fan speed value (i.e. 100%). In other examples, the input type can be defined to mean an RPM value (i.e. 100 RPM). In some embodiment, the input type is defined by a BMS controller. Alternatively, the input type can be defined by a device controller (e.g. device controller 502 in FIG. 5), or the BMS device itself.

Figure 9:
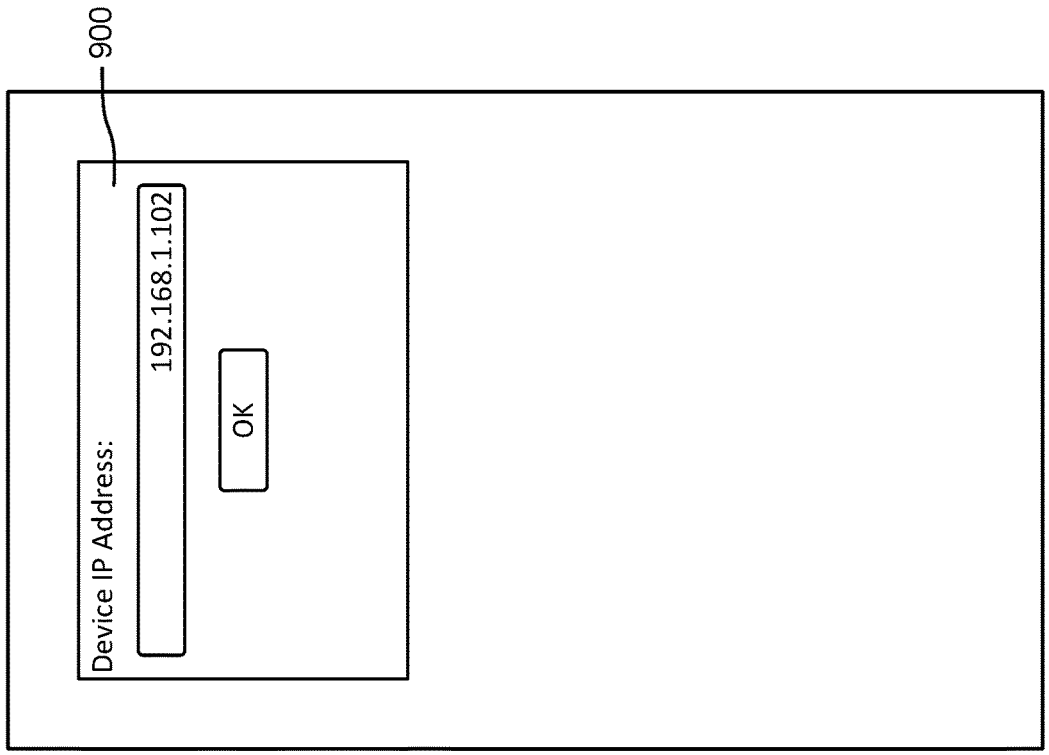
Figure 8:
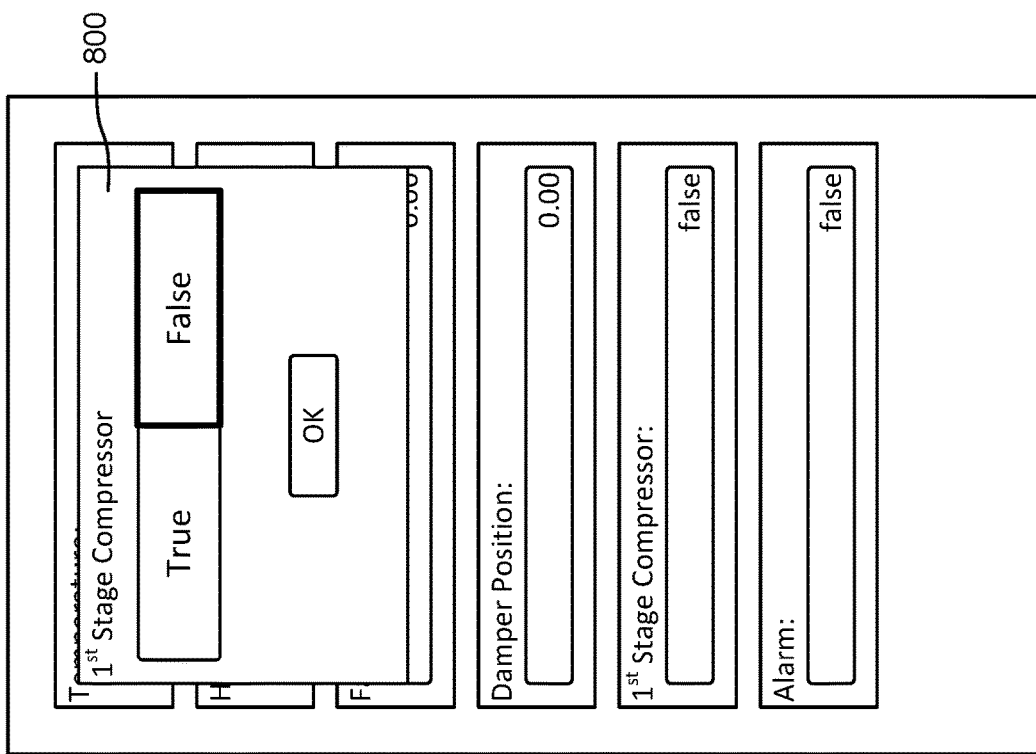

Referring now to AG. 8, a further parameter input dialog box 800 can be seen. Parameter input dialog box 800 can be allowed for a discrete selection of a given parameter. For example, parameter input dialog box 800 is shown as requiring a parameter value of "True" or "False" to be selected for the compressor parameter 610. As stated above, the input type (e.g. "true" or "false") can be defined by a BMS controller, a device controller or a BMS device. Referring now to FIG. 9, a further parameter dialog box 900 can be seen. Parameter dialog box 900 can display an IP device of the BMS device. In some embodiment, parameter dialog box 900 can be an input dialog box, thereby allowing a user to modify the device IP address via the user interface 600.

Figure 10:
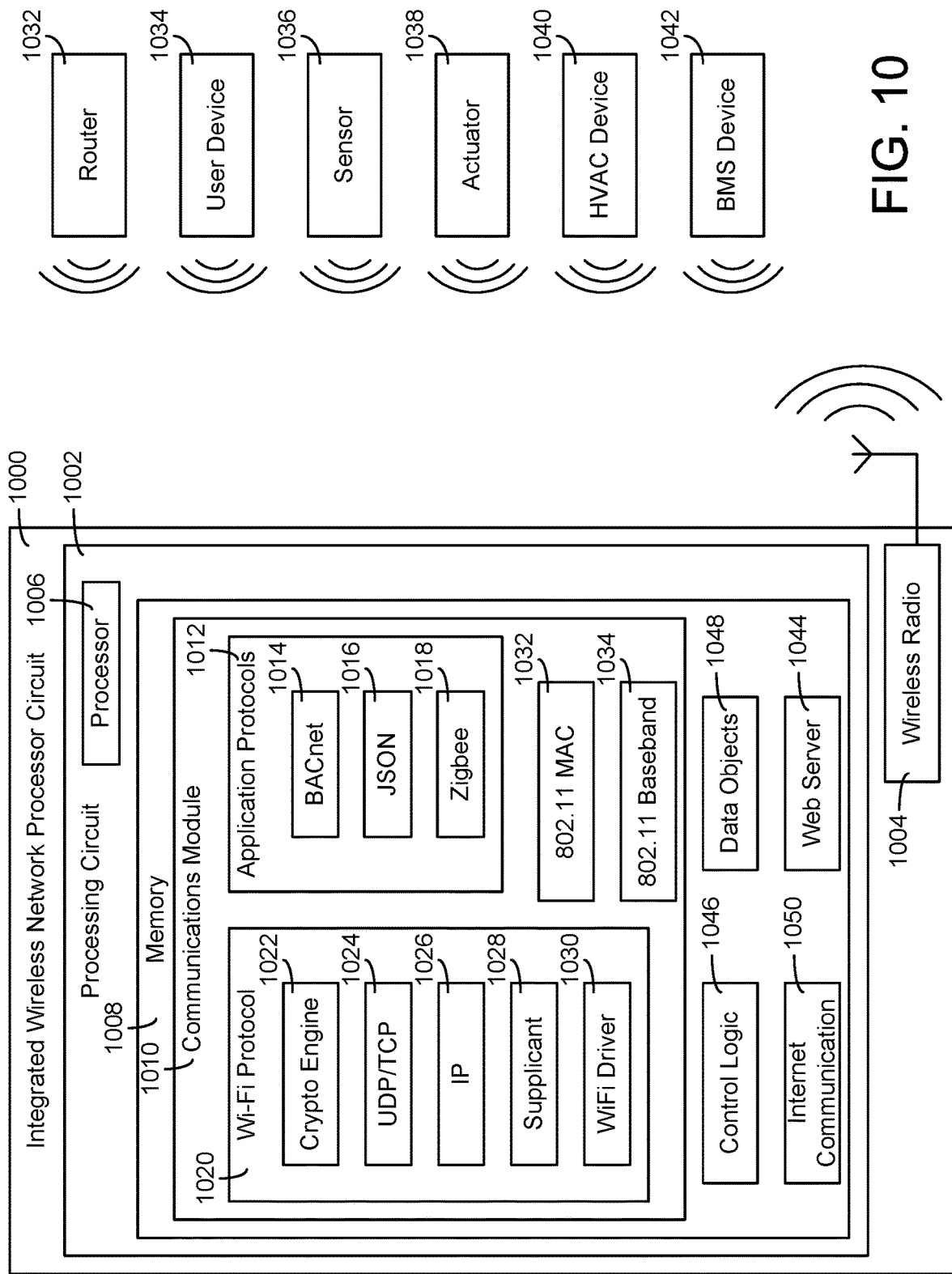
FIG. 10 is a block diagram of an integrated wireless network processor chip which may be used in the building automation and control network of FIG. 5 to facilitate wireless communications and data processing within a single chip of a BMS device, according to one embodiment.

Referring now to FIG. 10, a block diagram illustrating an integrated wireless network processor circuit 1000 in greater detail is shown, according to one embodiment. The integrated wireless network processor circuit 1000 is shown to include a processing circuit 1002 and a wireless radio 1004. In some embodiments, the wireless radio is an 802.11 b/g/n WiFi radio. In other embodiments the wireless radio 1004 can be a Zigbee radio, a Bluetooth radio, a cellular radio (3G, 4G, LTE, CDMA, etc.) a near field communication (NFC) radio, a LoRa RF radio, etc. The processing circuit 1002 may be communicably connected to the wireless radio 1004 such that the processing circuit 1002 and the various components thereof can send and receive data via the wireless radio 1004. In one embodiment, the processing circuit 1002 includes a processor 1006 and a memory 1008. The processor 1006 can be implemented as a general purpose processor, an application specific integrated circuit (ASIC), one or more field programmable gate arrays (FPGAs), a group of processing components, or other suitable electronic processing components. In some embodiments, the processor 1006 is an ARM microcontroller unit (MCU).

The memory 1008 (e.g., memory, memory unit, storage device, etc.) may include one or more devices (e.g., RAM, ROM, Flash memory, etc.) for string data and/or computer code for completing or facilitating the various processes, layers and modules described in the present application. The memory 1008 may be or include volatile memory or non-volatile memory. The memory 1008 may include database components, object code components, script components, or any other type of information structure for supporting the various activities and information structures described in the present application. According to an exemplary embodiment, the memory 1008 is communicably connected to the processor 1006 via the processing circuit 1002 and includes computer code for executing (e.g., by the processing circuit and/or the processor) one or more processes described herein.

The integrated wireless network processor chip 1002 is shown to include a communications module 1010. The communications module 1010 may allow the integrated wireless network processor chip 1000 to communicate using any of a variety of communications protocols. In one embodiment, the communications module 1010 includes a number of application protocols/stacks in an application protocol module 1012. The application protocol module 1012 include a BACnet communication stack 1014, a JavaScript Object Notation (JSON) communication stack 1016, and a Zigbee communication stack 1018. Other possible communication protocols/stacks can include NFC communication stacks, Bluetooth communication stacks, LoRa communication stacks and/or any other wireless communications protocol. The BACnet communication stack can support standard BACnet UDP/IP wireless communications. Further, the BACnet communication stack can utilize standard BACnet IP messaging, allowing for BMS controllers and devices to discover, monitor, and control other I/O points on the BACnet network. Further, the BACnet communication stack 1014 can map physical I/O points associated with a device in communication with the integrated wireless network processor circuit 1000 (e.g. device controller 502 of FIG. 5). The BACnet communication stack 1014 can provide for wireless UPD/IP communication to BACnet connected devices via the integrated wireless network processor circuit 1000, as discussed below.

In one embodiment, the JSON communication stack 1016 supports the internet-of-things (IoT) RESTful JSON HTTP(s) TCP/IP wireless communication. This can allow for mobile devices, such as smart phones (iPhone, Android phone, Windows phone, etc.), tablet computers (iPad, Microsoft Surface, etc) or other mobile devices with wireless communication capability to communicate with the BMS. Further, using the JSON communication stack in combination with the integrated wireless network processor circuit 1000, can allow a user to commission and/or diagnose BMS devices through the integrated wireless network processor circuit 1000. For example, a device controller (e.g. device controller 502 of FIG. 5) could communicate with a mobile device through an associated integrated wireless network processor circuit 1000 using the JSON communication stack 1016. In some examples, custom iPhone and/or Android applications can be designed to interface with the integrated wireless network processor circuit 1000 using the JSON communication stack 1016. Additionally, other IoT systems that support RESTful JSON messaging can be used to wirelessly monitor and control a device in communication with the integrated wireless network processing circuit 1000 using the JSON communication stack 1016.

The integrated wireless network processor chip 1000 is further shown to include an 802.11 b/g/n (Wi-Fi) communication protocol module 1020. In one embodiment, the Wi-Fi communication protocol module 1020 includes a cryptography engine 1022, a UDP/TCP protocol stack 1024, an IP protocol stack 1026, a supplicant 1028, and a Wi-Fi driver 1030. In one embodiment, the cryptography engine 1022 can support secure and encrypted communications links between the integrated wireless network processing chip 1000 and one or more other devices. For example the cryptography engines 1022 can be used to generate secure connections such as TSL and/or SSL connections. The cryptography engine 1022 may further be configured to use Wi-Fi security protocols such as WPS 2.0, WPA2 personal, and/or enterprise security. The communications module 1010 can further include a media access control (MAC) module 1032, and an 802.11 baseband module 1034.

In some embodiments, the integrated wireless network processor chip 1000 is configured to communicate using Wi-Fi, using the Wi-Fi driver 1030. For example, the integrated wireless network processor chip 1000 may connect to a router 1032, a user device 1034, a sensor 1036, an actuator 1038, an HVAC device 1040, and/or one or more BMS devices 1042 using any of a variety of WiFi modes (e.g., station, access point, WiFi direct, etc.). The user device 1034 can be a mobile device such as a smartphone, tablet, personal computer, etc. In some embodiments, the integrated wireless network processor chip includes a web server 1044 (e.g., an HTTP server). The web server 1044 may be configured to generate a webpage that can be loaded and rendered by a user device 1034 connecting directly to the integrated wireless network processor chip 1000. In one embodiment, the user device 1034 can further communicate with the integrated wireless network processor chip 1000 to connect directly to building control network such as BACnet and/or JSON via the BACnet communication stack 1114 and the JSON communication stack 1016.

Still referring to FIG. 10, the integrated wireless network processor chip 1000 is shown to include control logic 1046 and data objects 1048. The control logic 1046 may include closed loop control, feedback control, PI control, model predictive control, or any other type of automated control methodology to control a variable affected by operation of an associated BMS device, such as an HVAC device (e.g., a temperature within a building). The control logic 1046 may use the data received via the wireless radio 1004 to perform control operations. For example, the control logic may use data received from an HVAC device 1040 via the wireless radio as inputs to a control algorithm to determine an output for one or more BMS devices (e.g., dampers, air handling units, chillers, boilers, fans, pumps, etc.) in order to affect a variable state or condition monitored by the device controller, such as device controller 502. Advantageously, the control functionality of a device controller may be implemented entirely by the integrated wireless network processor chip 1000 without requiring additional processing or control components. For example, the processor 1006 can implement the control logic 1046 without requiring additional processing by a device controller. The data objects 1048 can include data point objects, control parameter objects, fault objects, settings objects, etc. In one embodiment, the web server 1044 may select one or more of the data objects 1048 for inclusion in a web portal generated by the web server 1044. The data objects 1048 may be stored as floating values, enumerated values, text strings, and/or any other type of data format. Further, the data objects 1048 can include data received from the user device 1034, sensors 1036, actuators 1038, HVAC devices 1040 and/or other BMS devices 1042 coupled to the integrated wireless network processing circuit 1000.

Further, referring to FIG. 10, the integrated wireless network processor circuit 1000 is shown to include an internet communication module 1050. In one embodiment, the internet communication module 1050 can provide notifications to a user via an internet connection. In one embodiment, the internet communication module 1050 accesses the internet using the UDP/TCP protocol stack 1024 and/or the IP protocol stack 1026 in combination with the wireless radio 1004. For example, the wireless radio 1004 can communicate with the router 1032 to establish a connection to the internet. The internet communication module 1050 can provide a notification to a user by generating an electronic message such as an e-mail or a text message. Additionally, the notification can be provided to a user via a push notification provided to a mobile device. In one example, e-mail addresses and/or cellular telephone numbers can be stored in the memory 1008 corresponding to relevant users. In some embodiments, the notification can inform a user of a fault condition. Other notifications can include needed maintenance, current status, or even a user defined data history. For example, a user may request a notification providing historical data of one or more BMS devices in communication with the integrated wireless network processor circuit 1000. The integrated wireless network processor chip 1000 may generate the historical report based on the user input, and transmit the report to the user via the internet communication module 1050.

Further, the internet communication module 1050 can allow for updates to be provided to the integrated wireless network processor circuit 1000. For example, a firmware update may be able to be pushed to the wireless network processor circuit 1000 over the internet using the internet communication module 1050. In another embodiment, the internet communication module 1050 is used to allow for cloud based control of the integrated wireless networking processor circuit 1000. For example, the integrated wireless networking processor chip 1000 can be in communication with one or more BMS devices. The integrated wireless networking processor circuit 1000 can further be in communication with a cloud based control system via the internet communication module 1050. The cloud based control system can then be accessed by users with the proper credentials via a connection to the internet. Based on a permission level of a user accessing the cloud based control system, a user can read and/or write values to certain parameters associated with BMS devices in communication with the integrated wireless network processor circuit 1000 via a user interface.

Figure 11:
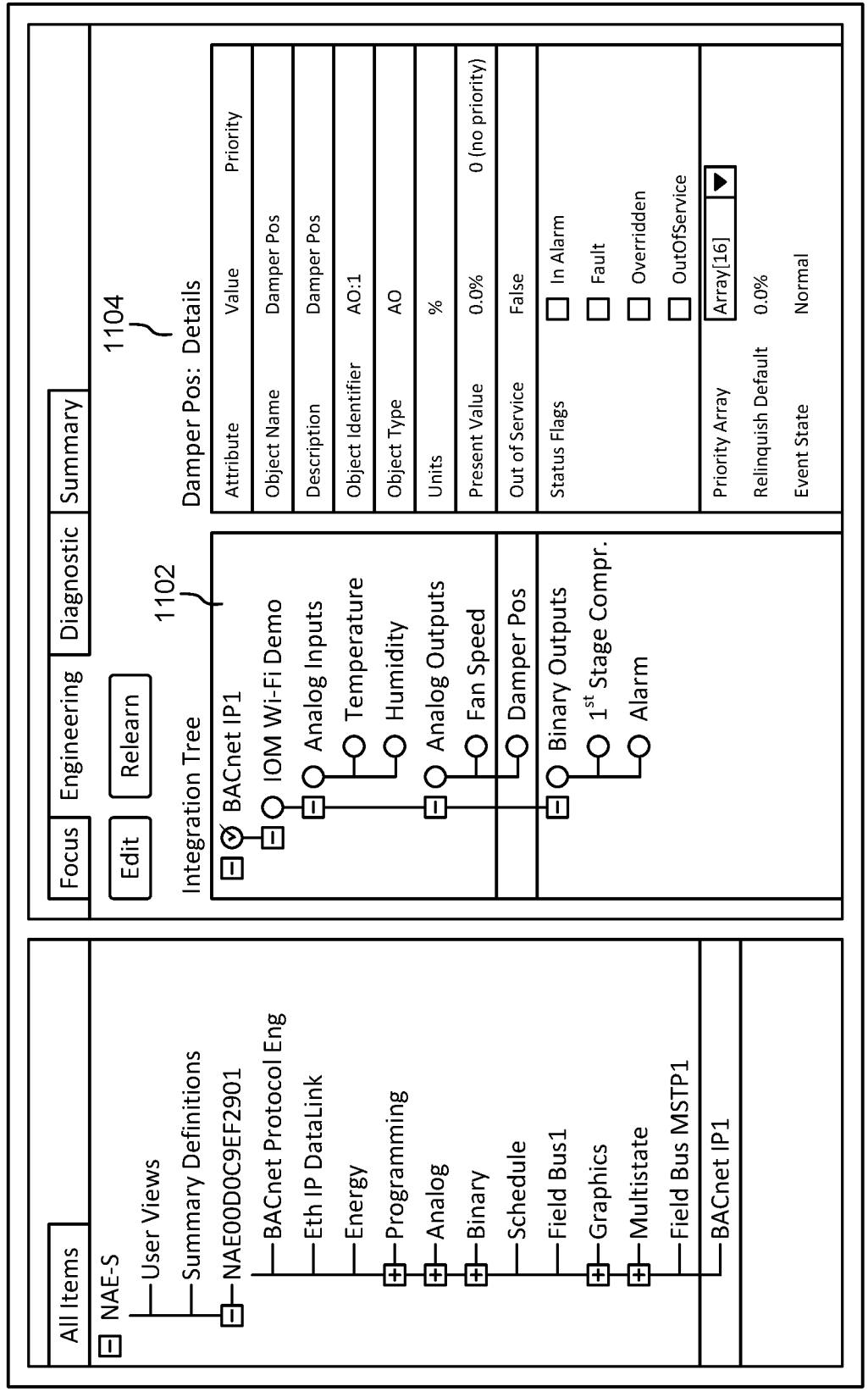
FIG. 11 is a representation of a user interface presented to a user in a cloud based control system, according to one embodiment.

Referring now to FIG. 11, an embodiment of an example user interface 1100 that can be presented in a cloud based control system to a user can be seen. The user interface 1100 can include an integration tree window 1102. The integration tree window 1102 can allow the user to select one or more parameters associated with a particular BMS device. For example, the BMS device can be an HVAC device, such as an AHU or VAV. In one embodiment, the parameters associated with the user device can be divided into types. For example, integration tree window 1102 divides the parameters of the connected BMS device into "Analog Inputs," "Analog Outputs" and "Binary Outputs" groups. Under each group, the individual parameters can be listed. For example, in the "Analog Inputs" group, the parameters can include temperature and humidity, as shown. A user can then select which parameter they want to view using the user interface 1100. The user interface 1100 can further include a details window 1104. The details window can provide details regarding the selected parameter. In some embodiments, the user can change the parameters in the detail window 1104 where the parameters are writable. In some embodiments, a parameter can be preset to be writable based on the type of parameter and BMS device. Further, a parameter may only be writable when a user has provided the proper credentials.

Figure 12:
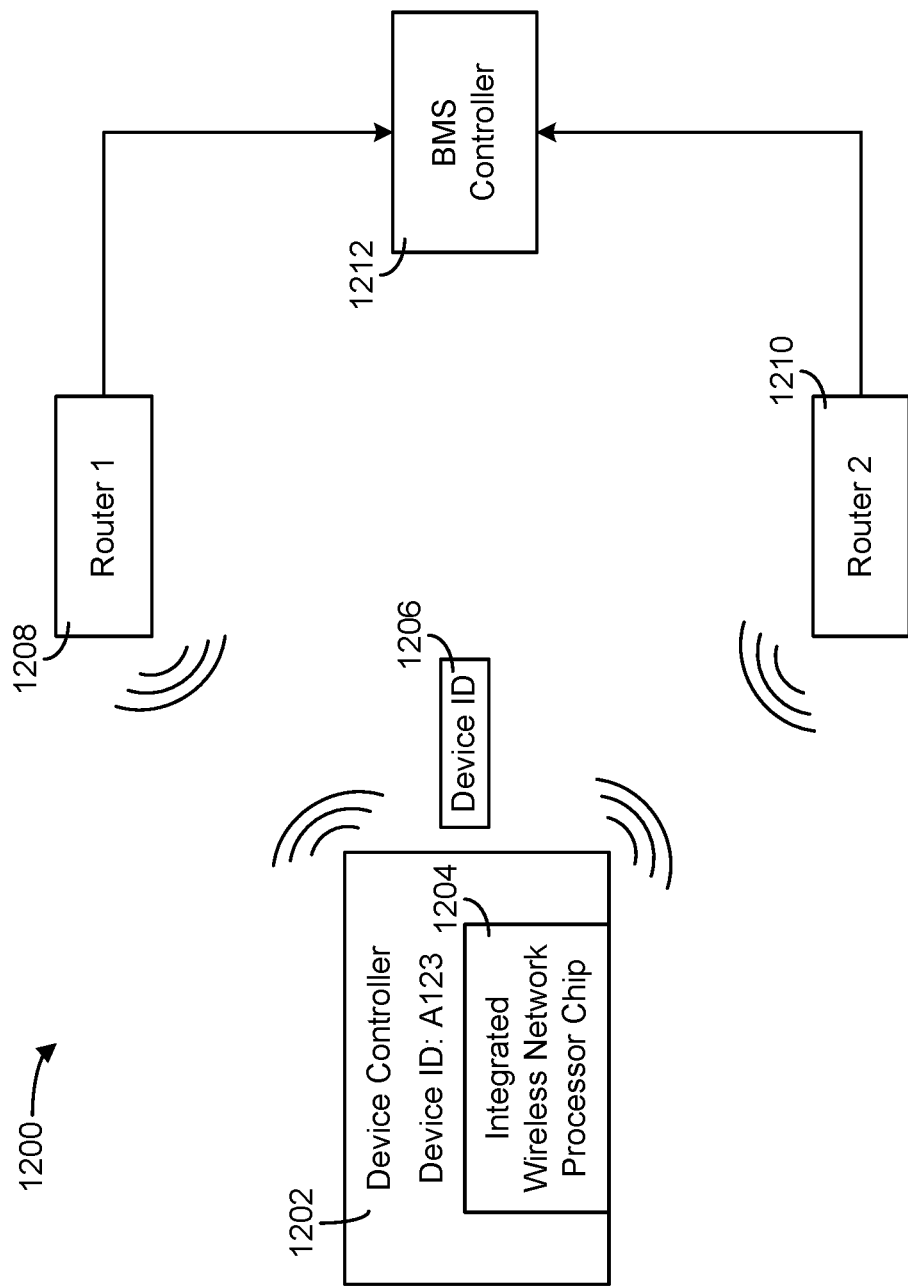
FIG. 12 is a block diagram illustrating a process for determining the location of a BMS device in a building automation and control network using wireless communications provided by the integrated wireless network processor chip of FIG. 6, according to an exemplary embodiment.

Referring now to FIG. 12, a block diagram of a location determination system 1200 is shown, according to one embodiment. In one embodiment, a location of a device controller 1202 having an integrated wireless network processor chip 1204 is determined automatically using the wireless communication capabilities of the integrated wireless network processor chip 1204. In one example the device controller 1202 can be a device controller as discussed above in regards to FIG. 5. However, the wireless communications provided by the integrated wireless network processor chip 1204 may allow the location of any other device implementing the integrated wireless network processor chip 1204 to be determined automatically. The device controller 1202 may broadcast a device ID 1206 using the integrated wireless network processor chip 1204. One or more routers 1208, 1210 may detect the broadcasted device ID 1206 and measure a signal strength associated therewith. The router(s) 1208, 1210 may report the detected device ID and the signal strength to a BMS controller 1212 (e.g., a central controller for the BMS). The BMS controller 1212 may use this information to determine a three-dimensional location of the device controller 1202. For example, the BMS controller 1212 may use known locations of the router(s) 1208, 1210 to determine a location that is likely to be within range of all the router(s) 1208, 1210 that detect the same device controller 1202. The BMS controller 1212 may be configured to associate the three-dimensional location with the device identifier 1206 and to store the association in a locations database 1214.

Figure 13:
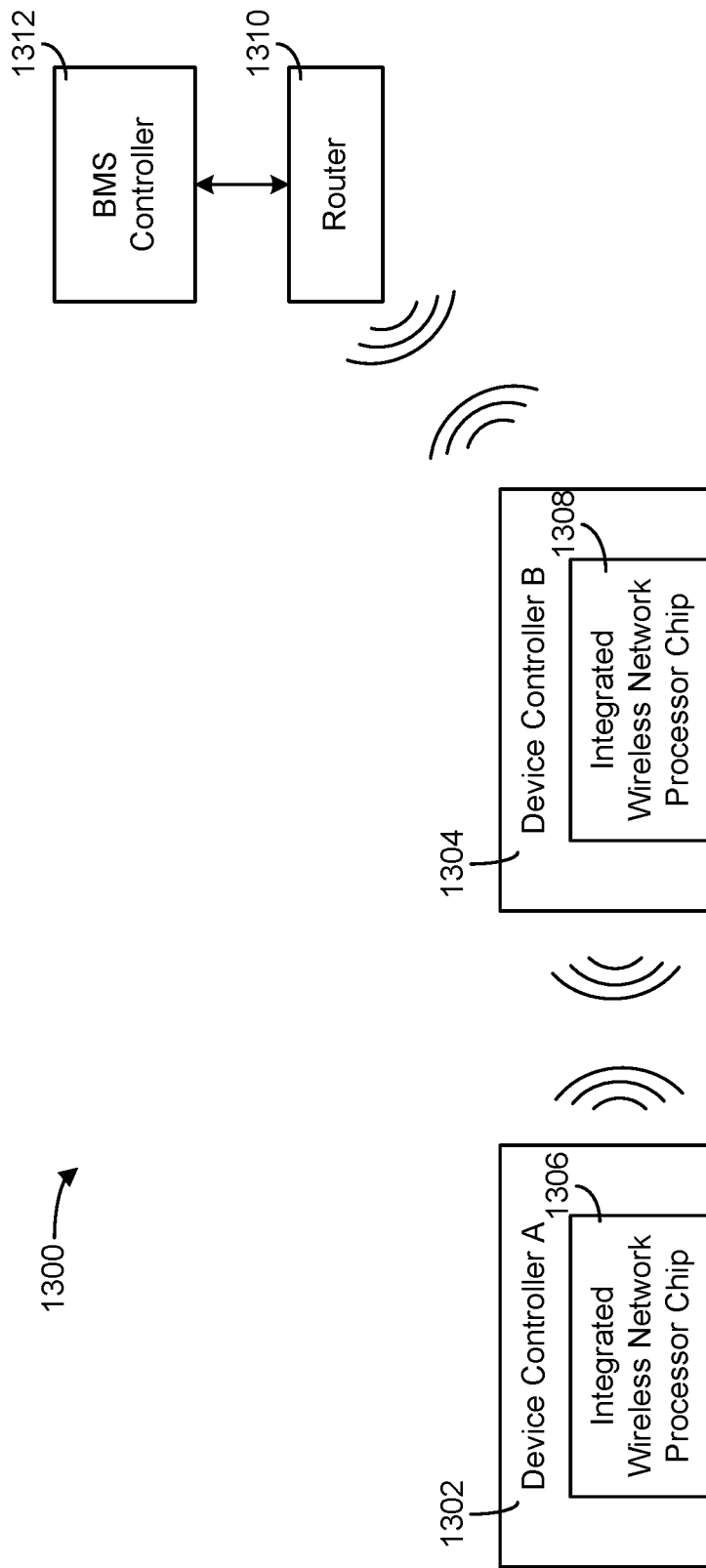
FIG. 13 is a block diagram illustrating a process for relaying data via a mesh network of BMS devices equipped with the integrated wireless network processor chip of FIG. 6, according to an exemplary embodiment.

Referring now to FIG. 13, a block diagram of a mesh network data relaying system 1300 is shown, according to one embodiment. The system 1300 may include a number of device controllers. As shown, the system 1300 includes device controller "A" 1302 and device controller "B" 1304. Each device controller 1302, 1304 may include an integrated wireless network processor chip 1306, 1308. In one embodiment, the wireless communications provided by the integrated wireless network processor chips 1306, 1308 allows the device controllers (or any other device implementing the integrated wireless network processor chips 1306, 1308) to form a mesh for relaying data communications. This functionality may be useful if one of the device controllers 1302, 1304 is located out of wireless communication range of a router 1310, but within wireless communication range of another one of the device controllers 1302, 1304. For example, FIG. 13 shows device controller "A" 1302 sending data to device controller "B" 1304 via a wireless link between device controller "A" 1302 and device controller "B" 1304. Device controller "B" 1304 may relay data from device controller "A" 1302 to the router 1310, which can then communicate the data to a BMS controller 1312, or other device connected to the router 1310. In one example, the router 1310 can communicate the information to a cloud based server via an internet connection. Communications may be provided from the router 1310 to device controller "A" 1302 in a similar manner. For example, the router 1310 may send data to device controller "B" 1304 via a wireless link between the router 1310 and device controller "B" 1304. Device controller "B" may relay the data from the router 1310 to device controller "A" 1302. Although only two device controllers 1302, 1304 are shown in FIG. 13, it is contemplated that any number of device controllers (or any other device implementing the integrated wireless network processor chip) may form a network mesh of any size or complexity. In some embodiments, the device controllers 1302, 1304 can be configured to automatically configure themselves into a meshed network configuration.

Figure 14:
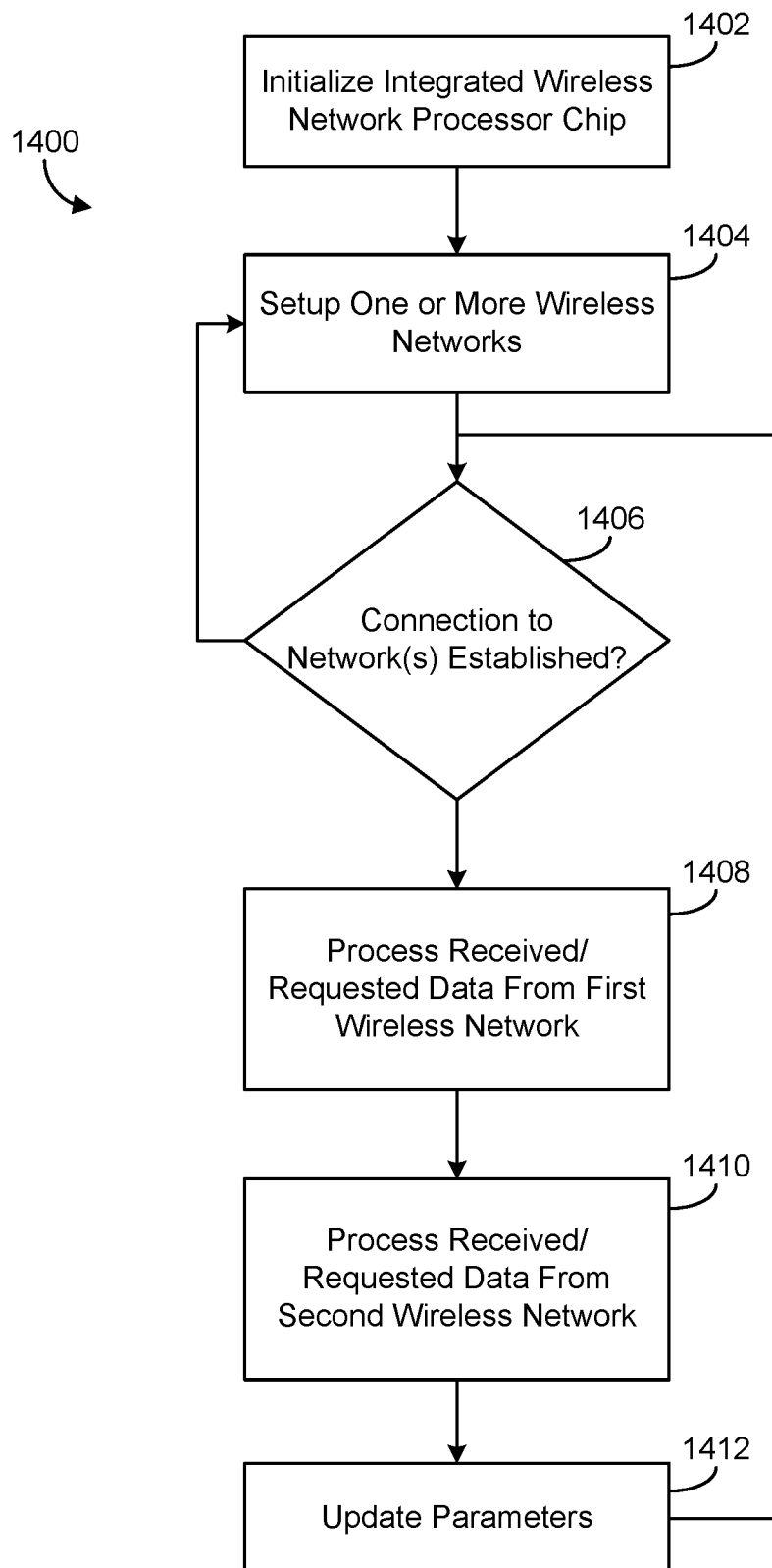
FIG. 14 is a flow chart illustrating a process for connecting an integrated wireless network processor chip to one or more wireless networks, according to one embodiment.

Referring now to FIG. 14, a process 1400 for establishing a communication network using an integrated wireless network processor chip is shown, according to one embodiment. At process step 1402, the integrated wireless network processor chip can be initialized. In one embodiment, initializing the integrated wireless network processor includes initialization of the processor, one or more timers, and the inputs and outputs (I/O). In some examples, the I/O can be general purpose (GPIO) points on the integrated wireless network processor chip. The I/O can further be dedicated I/O, such as digital, analog, etc. In one embodiment, the initialization process 1402 can be initiated during a power-up period of the integrated wireless network processor chip. At process block 1404, the integrated wireless network processor chip can setup one or more wireless networks. For example, the integrated wireless network processor chip may setup a first network for communication with a number of BMS devices over an internal network, such as an BACnet network, a master/slave token passing (MSTP) network, or other wireless networks for communication with one or more BMS devices. In other examples, the integrated wireless network processor chip could set up a general communication network for communication to other devices, such as routers, controllers (e.g. BMS controllers), mobile devices, etc. In one embodiment, the integrated wireless network processor chip creates a JSON and/or RESTful JSON network for communication with mobile devices. However, other networks, such a Zigbee, LoRA, LAN, TCP/IP, Wi-Fi, etc. can further be setup by the integrated wireless network processor chip as applicable.

At decision block 1406, the integrated wireless network processor chip can determine if it is connected to the one or more wireless networks that the integrated wireless network processor chip set up at process block 1404. In one embodiment, the integrated wireless network processor chip transmits a test message to the one or more networks requesting a response from the networks. In other examples, the integrated wireless network processor chip may passively monitor the networks for transmissions made by other devices on the networks to determine if the integrated wireless network processor chip is connected to the network. However, other methods of determining if the integrated wireless network processor chip is connected to one or more networks are contemplated. If the integrated wireless network processor chip determines that it is not connected to the one or more networks set up in process block 1404, the process 1400 can return to process block 1404 to attempt to setup one or more of the networks again to connect the integrated wireless network processor chip to the desired networks. In one embodiment, the process 1400 can attempt to connect the integrated wireless network processor chip to the network for a predetermined amount of time. If the integrated wireless network processor chip is not able to connect to one or more of the networks by the expiration of the predetermined time, the process 1400 may time out. In some examples, the predetermined amount of time can be about ten seconds; however, predetermined amounts of time greater than ten seconds and less than ten seconds are also considered. In other embodiments, the process 1400 can attempt to connect the integrated wireless network processor chip to the networks for a predetermined number of attempts. If the integrated wireless network processor chip is not able to connect to one or more of the networks in the predetermined number of attempts, the process 1400 may time out. In some examples, the predetermined number of attempts can be ten attempts; however, more than ten attempts or less than ten attempts are also considered. The integrated wireless network processor chip may provide a notification or alert to a user. For example, an illumination device such as an LED on the integrated wireless network processor chip may flash in a sequence or pattern to indicate that the process had timed out.

If the process 1400 determines that connection to the one or more networks has been established at process block 1406, the process 1400 can proceed to process block 1408. At process block 1408, the integrated wireless network processor chip can process data requested or received on a first network. For example, the integrated wireless network processor chip may receive a request for a status of one device from a separate device on the first network. The process 1400 can then proceed to process block 1410, where the integrated wireless network processor chip can process data requested or received on a second network, if applicable. Once the data has been processed in process blocks 1408 and 1410, the integrated wireless network processor chip can update parameters at process block 1412. In one embodiment, the integrated wireless network processor chip can update the I/O based on the processed data. In other examples, the integrated wireless network processor chip can provide updated parameters to other devices connected to the one or more networks, based on the processed data. The process 1400 can then return to process block 1406 to verify the connection to the one or more networks and continuing to process data from the one or more networks.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A controller in a building management system (BMS), the controller comprising:
   an integrated wireless network processor chip comprising:
      a wireless radio configured to communicate with one or more BMS devices;
      a processor in communication with the wireless radio and located on a same chip as the wireless radio; and
      memory in communication with the wireless radio and located on the same chip as the wireless radio and the processor, the memory comprising communication stacks configured to facilitate communication using a building automation and control network communications protocol and a Wi-Fi communications protocol, wherein the integrated wireless network processor chip provides the communication with the one or more BMS devices with a user device configured to access one or more of the BMS devices using an application installed on the user device;
   wherein the integrated wireless network processor chip is configured to receive data from the one or more BMS devices via the wireless radio, format the data from the one or more BMS devices using the processor, and send the data from the one or more BMS devices via the wireless radio to the user device using the Wi-Fi communications protocol.

2. The controller of claim 1, wherein the wireless radio is an 802.11 b/g/n Wi-Fi radio and the controller comprises an interface for providing a temperature setpoint and receives a temperature parameter.

3. The controller of claim 1, wherein the communications stacks are configured to facilitate communications using a JavaScript Object Notation communications protocol.

4. The controller of claim 1, wherein the memory comprises a web server configured to generate a web page and serve the web page to the user device via the wireless radio.

5. The controller of claim 4, wherein the web page comprises at least one of the data from the BMS devices, configuration information for the thermostat, and commissioning information for the thermostat.

6. The controller of claim 1, wherein the memory comprises control logic configured to use the data from the BMS devices to generate a control output that is communicated to the BMS devices via the wireless radio.

7. The controller of claim 1, wherein the memory comprises a cryptography engine configured to encrypt or decrypt data communicated via the wireless radio.

8. The controller of claim 1, wherein the integrated wireless network processor chip is configured to receive data from another integrated wireless network processor chip in another thermostat and relay the data to a router out of range of the other thermostat.

9. A building management system, the system comprising:
   one or more heating, ventilating or air conditioning (HVAC) devices; and
   an HVAC controller, the HVAC controller comprising an integrated wireless network processor chip, the integrated wireless network processor chip comprising:

a wireless radio configured to communicate with the one or more HVAC devices;
a processor in communication with the wireless radio and located on a same chip as the wireless radio; and
memory in communication with the wireless radio and located on the same chip as the wireless radio and the processor;
wherein the integrated wireless network processor chip provides communication with the one or more HVAC devices using a first communication protocol associated with a first communication stack contained in the memory, and provides communication with a user device using a second communication protocol associated with a second communication stack contained in the memory.

10. The system of claim 9, wherein the first communication protocol is a building automation and control network protocol and the second communication protocol is a Wi-Fi protocol.

11. The system of claim 9, wherein the second communication stack facilities communication using a JavaScript Object Notation communications protocol.

12. The system of claim 9, wherein the memory further includes a third communication stack.

13. The system of claim 9, wherein the integrated wireless network processor chip further comprises control logic.

14. The system of claim 13, wherein the control logic controls the one or more HVAC devices.

15. The system of claim 9, wherein the integrated wireless network processor chip is configured to provide a user interface on the user device, the user interface comprising at least one of data from the one or more HVAC devices, configuration information for the HVAC controller, and commissioning information for the HVAC controller.

16. A controller for a heating, ventilating or air conditioning (HVAC) system, the controller comprising:
an interface configured to receive a temperature setpoint and display a temperature parameter;
an integrated wireless network processor chip comprising:
a wireless radio;
a processor in communication with the wireless radio and located on a same chip as the wireless radio; and
memory in communication with the wireless radio and located on the same chip as the wireless radio and the processor, the memory comprising communication stacks configured to facilitate communication using a building automation and control network communications protocol and a Wi-Fi communications protocol, wherein the integrated wireless network processor chip provides communication with a BMS device using the building automation and control network communications protocol and provides communication with a user device using an application installed on the user device configured to provide a user interface for communicating via the wireless radio using the Wi-Fi communications protocol.

17. The controller of claim 16, wherein the controller is configured to display a humidity parameter.

18. The controller of claim 16, wherein the controller is configured to display a fan speed parameter.

19. The controller of claim 16, wherein the controller is configured to provide control in an air handling unit application.

20. The controller of claim 16, further comprising:
an input for receiving a temperature measurement from a remote source.

21. The controller of claim 16, further comprising:
an input for receiving an occupancy signal.

22. The controller of claim 16, wherein the processor is configured to broadcast a unique device identification for the controller.

23. The controller of claim 16, wherein the memory comprises a web server configured to generate a web page and serve the web page to the user device via the wireless radio.

24. The controller of claim 23, wherein the wireless radio is an 802.11 b/g/n Wi-Fi radio and the building automation and control network communications protocol is a BACnet protocol.

25. The controller of claim 21, wherein the user interface is for reading and writing to the BMS device via the controller using the building automation and control network communications protocol and the Wi-Fi communications protocol.

* * * * *